(12) United States Patent
DiPietro et al.

(10) Patent No.: US 8,604,135 B2
(45) Date of Patent: *Dec. 10, 2013

(54) THERMALLY REVERSIBLE CROSS-LINKED POLY(ARYL ETHER KETONE) MEDIA AND METHOD FOR HIGH DENSITY DATA STORAGE

(75) Inventors: Richard Anthony DiPietro, Campbell, CA (US); Urs T. Duerig, Rueschlikon (CH); Jane Elizabeth Frommer, San Jose, CA (US); Bernd Walter Gotsmann, Horgen (CH); James Lipton Hedrick, Pleasanton, CA (US); Armin W. Knoll, Zurich (DE); Teddie Peregrino Magbitang, San Jose, CA (US); Robert Dennis Miller, San Jose, CA (US); Russell Clayton Pratt, Oakland, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/170,997

(22) Filed: Jun. 28, 2011

(65) Prior Publication Data

US 2011/0257344 A1 Oct. 20, 2011

Related U.S. Application Data

(60) Division of application No. 12/058,937, filed on Mar. 31, 2008, which is a continuation of application No. 11/626,407, filed on Jan. 24, 2007, now Pat. No. 8,012,541.

(51) Int. Cl.
*C08F 16/36* (2006.01)
*C08F 216/36* (2006.01)
*B05D 3/02* (2006.01)

(52) U.S. Cl.
USPC .............. 525/328.6; 525/328.9; 525/328.1; 525/330.9

(58) Field of Classification Search
USPC .............. 525/328.6, 328.9, 328.1, 330.9
See application file for complete search history.

(56) References Cited

U.S. PATENT DOCUMENTS 5,422,423 A 6/1995 Shacklette et al.
5,464,923 A 11/1995 Vicari et al.
(Continued)

FOREIGN PATENT DOCUMENTS

EP 05405018.2 1/2005

OTHER PUBLICATIONS

Office Action (Mail Date Jun. 24, 2011 ) for U.S. Appl. No. 12/058,937, filed Mar. 31, 2008.

(Continued)

*Primary Examiner* — Duc Truong
(74) *Attorney, Agent, or Firm* — Schmeiser, Olsen & Watts

(57) ABSTRACT

A composition of matter for a recording medium in atomic force data storage devices. The composition includes one or more poly(aryl ether ketone) copolymers, each of the one or more poly(aryl ether ketone) copolymers including (a) a first monomer including an aryl ether ketone and (b) a second monomer including an aryl ether ketone and a hydrogen bonding cross-linking moiety, the moiety capable of forming two or more hydrogen bonds at room temperature, each of the one or more poly(aryl ether ketone) copolymers having two terminal ends, each terminal end having a phenylethynyl moiety. The covalent and hydrogen bonding cross-linking of the poly(aryl ether ketone) oligomers may be tuned to match thermal and force parameters required in read-write-erase cycles.

13 Claims, 3 Drawing Sheets

(56) References Cited

U.S. PATENT DOCUMENTS

| | | |
|---|---|---|
| 6,355,357 B1 | 3/2002 | Takahashi et al. |
| 6,383,415 B1 | 5/2002 | Angelopoulos et al. |
| 6,423,772 B1 | 7/2002 | Zhang et al. |
| 8,012,541 B2 | 9/2011 | DiPietro et al. |
| 2005/0047307 A1 | 3/2005 | Frommer et al. |
| 2005/0050258 A1 | 3/2005 | Frommer et al. |
| 2007/0296101 A1 | 12/2007 | DiPietro et al. |
| 2008/0076903 A1 | 3/2008 | Duerig et al. |
| 2008/0159114 A1 | 7/2008 | DiPietro et al. |
| 2008/0161527 A1 | 7/2008 | DiPietro et al. |
| 2008/0175139 A1 | 7/2008 | DiPietro et al. |
| 2008/0186612 A1 | 8/2008 | DiPietro et al. |

OTHER PUBLICATIONS

Notice of Allowance (Mail Date Apr. 29, 2011) for U.S. Appl. No. 11/626,407, filed Jan. 24, 2007.

Vettiger et al.; "The Millipede—More than one thousand tips for future AFM data storage"; IBM Journal of Research and Development, vol. 44, No. 3; May 2000; pp. 323-340.

Vettiger et al.; "The Millipede—Nanotechnology Entering Data Storage"; IEEE Transaction on Nanotechnology, vol. 1, No. 1; Mar. 2002; pp. 39-55.

Ma et al., Synthesis and characterization of fluorinated poly(aryl ether ether ketone)s terminated with a phenylethynyl group, Available online at www.sciencedirect.com, Materials Letters 60 (2006), pp. 1369-1373.

Office Action (Mail Date Jun. 24, 2011) for U.S. Appl. No. 12/058,937, filed Mar. 31, 2008.

Ma et al. ("Synthesis and Characterization of Fluorinated Poly(aryl ether ether ketone)s terminated with phenylethynyl group") Materials Letters vol. 60 Issue 11 pp. 1369-1373, available online Dec. 1, 2005.

THERMALLY REVERSIBLE CROSS-LINKED POLY(ARYL ETHER KETONE) MEDIA AND METHOD FOR HIGH DENSITY DATA STORAGE

This application is a division of U.S. patent application Ser. No. 12/058,937 filed Mar. 31, 2008 now U.S. Pat. No. 8,337, 954 which is a is a continuation of U.S. patent application Ser. No. 11/626,407 filed on Jan. 24, 2007 U.S. Pat. No. 8,012, 541.

FIELD OF THE INVENTION

The present invention relates to the field of high-density data storage and more specifically to compositions for a data storage medium, a data storage method and a data storage system using the data storage compositions.

BACKGROUND OF THE INVENTION

Current data storage methodologies operate in the micron regime. In an effort to store ever more information in ever-smaller spaces, data storage density has been increasing. As data storage size increases and density increases and integrated circuit densities increase, there is a developing need for data storage and imaging methodologies that operate in the nanometer regime.

SUMMARY OF THE INVENTION

A first aspect of the present invention is a composition of matter, comprising one or more poly(aryl ether ketone) copolymers, each of the one or more poly(aryl ether ketone) copolymers comprising (a) a first monomer including an aryl ether ketone and (b) a second monomer including an aryl ether ketone and a hydrogen bonding cross-linking moiety, the moiety capable of forming two or more hydrogen bonds at room temperature, each of the one or more poly(aryl ether ketone) copolymers having two terminal ends, each terminal end having a phenylethynyl moiety.

A second aspect of the present invention is a method comprising: heating the one or more poly(aryl ether ketone) copolymers of the first aspect to form a poly(aryl ether ketone) resin, the poly(aryl ether ketone) resin covalently cross-linked by cyclo-addition reactions of the phenylethynyl moieties.

A third aspect of the present invention is a method, comprising: forming a layer of poly(aryl ether ketone) resin by applying a layer of one or more poly(aryl ether ketone) copolymers and thermally curing the layer of one or more poly(aryl ether ketone) copolymers, each of the one or more poly(aryl ether ketone) copolymers comprising (a) a first monomer including an aryl ether ketone and (b) a second monomer including an aryl ether ketone and a hydrogen bonding cross-linking moiety, the moiety capable of forming two or more hydrogen bonds at room temperature, each of the one or more poly(aryl ether ketone) copolymers having two terminal ends, each terminal end having a phenylethynyl moiety, and bringing a thermal-mechanical probe heated to a temperature of greater than about 100° C. into proximity with the layer of a poly(aryl ether ketone) resin multiple times to induce deformed regions at points in the layer of the poly(aryl ether ketone) resin, the thermal mechanical probe heating the points in the layer of the resin and thereby writing information in the layer of the resin.

A fourth aspect of the present invention is a data storage device, comprising: a recording medium comprising a layer of poly(aryl ether ketone) resin overlying a substrate, in which topographical states of the layer of the poly(aryl ether ketone) resin represent data, the poly(aryl ether ketone) resin comprising thermally cured one or more poly(aryl ether ketone) copolymers, each of the one or more poly(aryl ether ketone) copolymers comprising (a) a first monomer including an aryl ether ketone and (b) a second monomer including an aryl ether ketone and a hydrogen bonding cross-linking moiety, the moiety capable of forming two or more hydrogen bonds at room temperature, each of the one or more poly(aryl ether ketone) copolymers having two terminal ends, each terminal end having a phenylethynyl moiety; a read-write head having one or more thermo-mechanical probes, each of the one or more thermo-mechanical probes including a resistive region for locally heating a tip of the thermo-mechanical probe in response to electrical current being applied to the one or more thermo-mechanical probes; and a scanning system for scanning the read-write head across a surface of the recording medium.

BRIEF DESCRIPTION OF DRAWINGS

The features of the invention are set forth in the appended claims. The invention itself, however, will be best understood by reference to the following detailed description of an illustrative embodiment when read in conjunction with the accompanying drawings, wherein:

DETAILED DESCRIPTION OF THE INVENTION

Figure 1A:
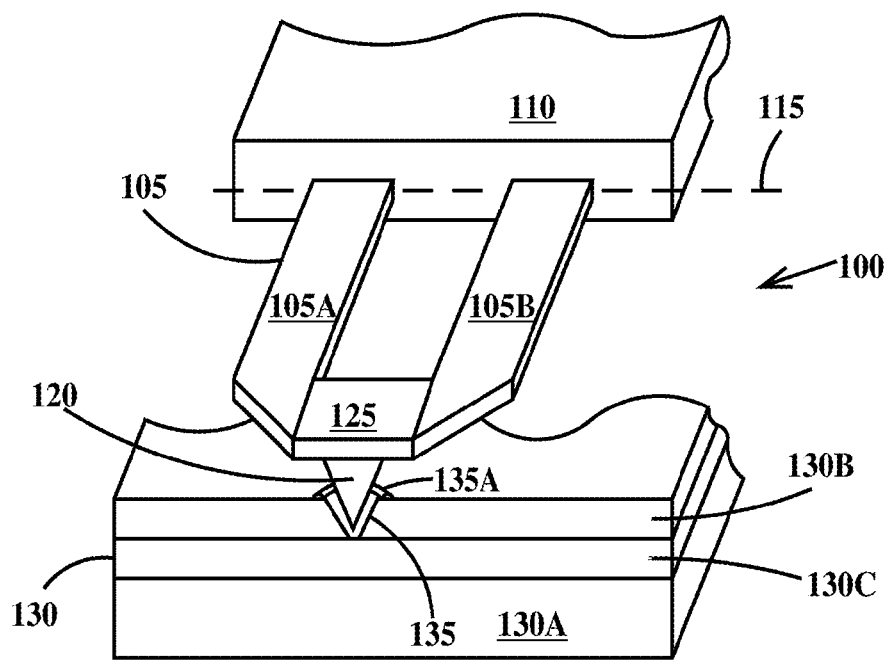
FIGS. 1A through 1C illustrate the structure and operation of a tip assembly for a data storage device including the data storage medium according to the embodiments of the present invention.
Figure 1B:
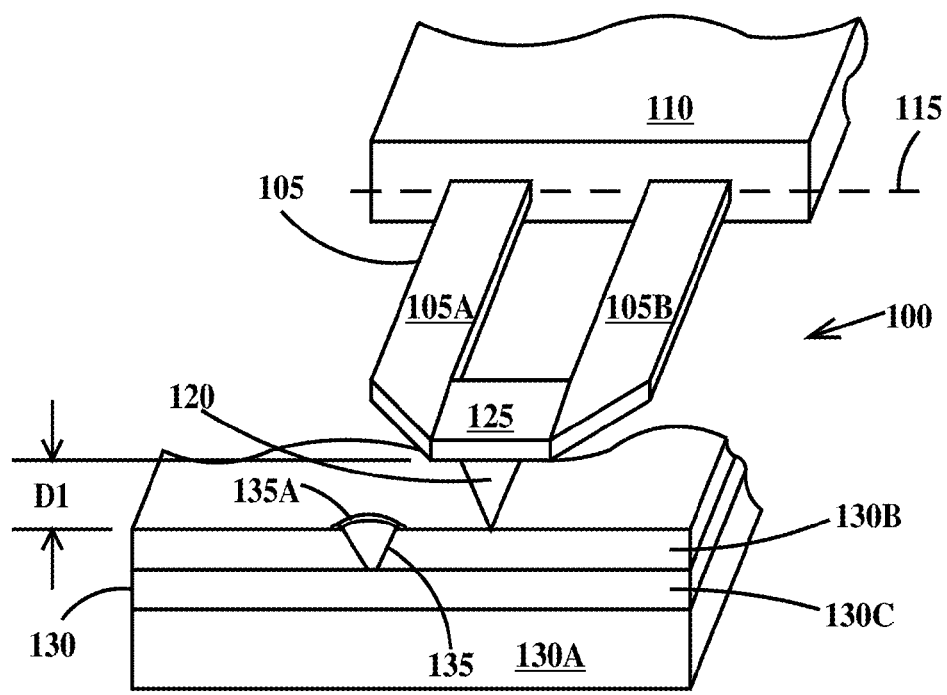
Figure 1C:
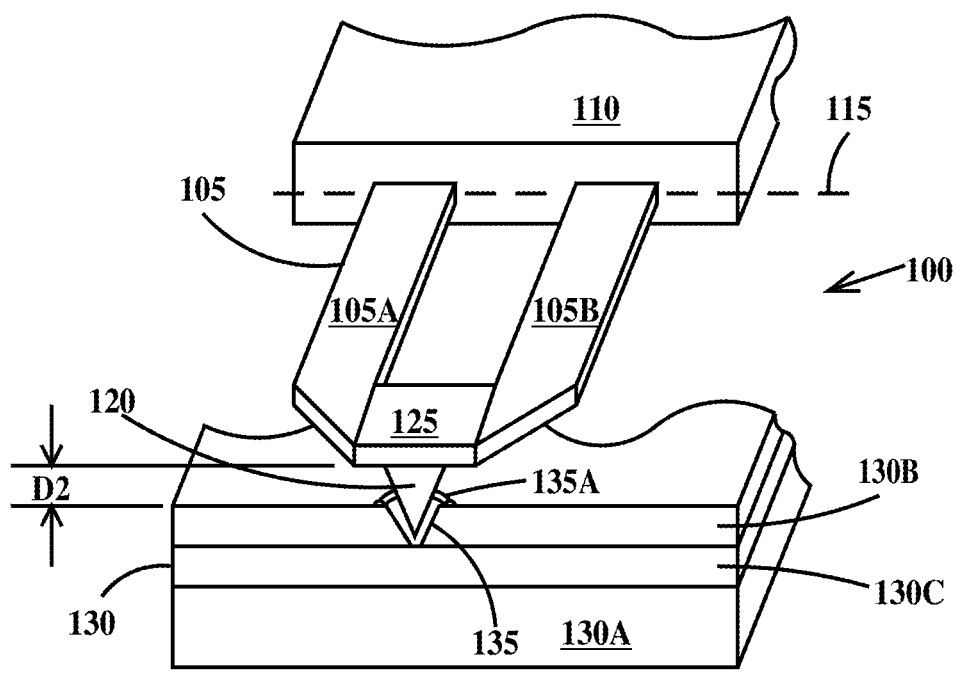

FIGS. 1A through 1C illustrate the structure and operation of a tip assembly 100 for a data storage device including the data storage medium according to the embodiments of the present invention. In FIG. 1A, probe tip assembly 100 includes a U-shaped cantilever 105 having flexible members 105A and 105B connected to a support structure 110. Flexing of members 105A and 105B provides for substantial pivotal motion of cantilever 105 about a pivot axis 115. Cantilever 105 includes a tip 120 fixed to a heater 125 connected between flexing members 105A and 105B. Flexing members 105A and 105B and heater 125 are electrically conductive and connected to wires (not shown) in support structure 110. In one example, flexing members 105A and 105B and tip 120 comprise highly-doped silicon and have a low electrical resistance, and heater 125 is formed of lightly doped silicon having a high electrical resistance sufficient to heat tip 120, in one example, between about 100° C. and about 400° C. when current is passed through heater 125. The electrical resistance of heater 125 is a function of temperature.

Also illustrated in FIG. 1A is a storage medium (or a recording medium) 130 comprising a substrate 130A, and a cured poly(aryl ether ketone) resin layer 130B. In one example, substrate 130A comprises silicon. Cured poly(aryl ether ketone) resin layer 130B may be formed by solution coating, spin coating, dip coating or meniscus coating uncured poly(aryl ether ketone) resin formulations and performing a curing operation on the resultant coating. In one example, cured poly(aryl ether ketone) resin layer 130B has a thickness between about 10 nm and about 500 nm and a surface roughness of less than about 1.0 nm evaluated in a 1 micron by 1 micron field and a variation in thickness of less than about 10% across the cured poly(aryl ether ketone) resin layer. Cured poly(aryl ether ketone) resin layer 130B includes thermally reversible hydrogen bonding cross-linking moieties as well as thermally irreversible (to at least 400° C.) covalent bonding cross-linking moieties. The composition of the uncured poly(aryl ether ketone) resin and cured poly(aryl ether ketone) resin layer 130B is described in detail infra. An optional penetration stop layer 130C is shown between cured poly(aryl ether ketone) resin layer 130B and substrate 130A. Penetration stop layer 130C limits the depth of penetration of tip 120 into cured poly(aryl ether ketone) resin layer 130B.

Turning to the operation of tip assembly 100, in FIG. 1A, an indentation 135 is formed in cured poly(aryl ether ketone) resin layer 130B by heating tip 120 to a writing temperature $T_W$ by passing a current through cantilever 105 and pressing tip 120 into cured poly(aryl ether ketone) resin layer 130B. Heating tip 120 and applying a load force, e.g. by electrostatic means, as described in Patent Application EP 05405018.2, 13 Jan. 2005, allows the tip to penetrate the cured poly(aryl ether ketone) resin layer 130B forming indentation 135, which remains after the tip is removed. In one example, the cured poly(aryl ether ketone) resin layer 130B is heated to about 100° C. or higher (depending upon the composition of cured poly(aryl ether ketone) layer 130B) by heated tip 120, and a load force of less than 500 nN is applied (the exact value depending upon the composition of cured poly(aryl ether ketone) layer 130B, the temperature of the heated tip and the desired indentation size) to form indentation 135. As indentations 135 are formed, a ring 135A of cured poly(aryl ether ketone) oligomer is formed around the indentation. Indentation 135 represents a data bit value of "1", a data bit value of "0" being represented by an absence of an indentation.

FIGS. 1B and 1C illustrate reading the bit value. In FIGS. 1B and 1C, tip assembly 100 is scanned across a portion of cured poly(aryl ether ketone) resin layer 130B. When tip 120 is over a region of cured poly(aryl ether ketone) resin layer 130B not containing an indentation, heater 125 is a distance D1 from the surface of the cured poly(aryl ether ketone) resin layer (see FIG. 1B). When tip 120 is over a region of cured poly(aryl ether ketone) resin layer 130B containing an indentation, heater 125 is a distance D2 from the surface of the cured poly(aryl ether ketone) resin layer (see FIG. 1C) because the tip "falls" into the indentation. D1 is greater than D2. If heater 125 is at a temperature $T_R$ (read temperature), which is lower than $T_W$ (write temperature), there is more heat loss to substrate 130A when tip 120 is in an indentation than when the tip is not. This can be measured as a change in resistance of the heater, thus "reading" the data bit value. It is advantageous to use a separate heater for reading, which is mechanically coupled to the tip but thermally isolated from the tip. A typical embodiment is disclosed in Patent Application EP 05405018.2, 13 Jan. 2005.

"Erasing" (not shown) is accomplished by positioning tip 120 in close proximity to indentation 135, heating the tip to a temperature $T_E$ (erase temperature), and applying a loading force $F_E$, which causes the previously written indent to relax to a flat state whereas a new indent is written slightly displaced with respect to the erased indent. The cycle is repeated as needed for erasing a stream of bits whereby an indent always remains at the end of the erase track. The erase temperature $T_E$ and the erase force $F_E$ may be chosen differently from the write temperature $T_W$ and the write force $F_W$. Typically, $T_E$ is greater than $T_W$, and/or $F_E$ is smaller than $F_W$. The erase pitch is typically on the order of the rim radius. In one example, the cured poly(aryl ether ketone) resin layer 130B is heated to about 100° C. or higher by heated tip 120, and the erase pitch is 10 nm to eliminate indentation 135.

Figure 2:
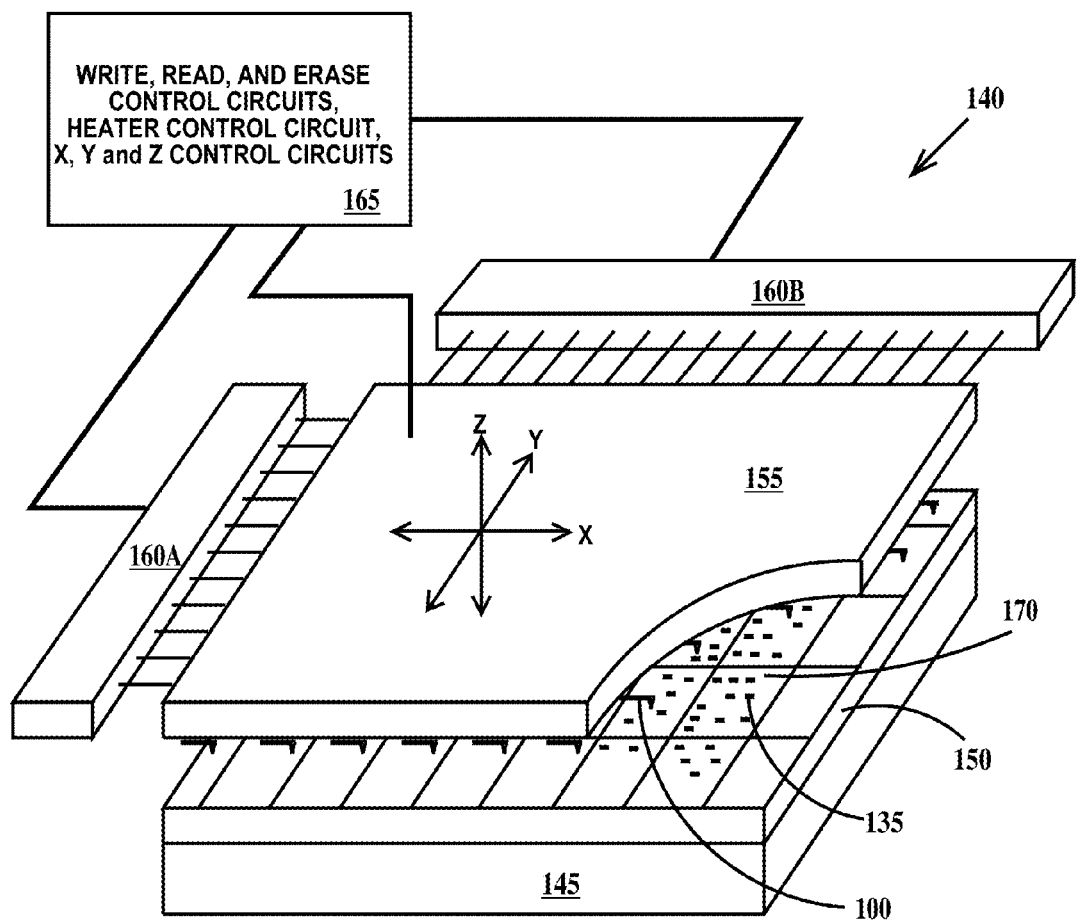
FIG. 2 is an isometric view of a local probe storage array including the data storage medium according to the embodiments of the present invention.

FIG. 2 is an isometric view of a local probe storage array 140 including the data storage medium according to the embodiments of the present invention. In FIG. 2, local probe storage array 140 includes substrate 145 having a cured poly (aryl ether ketone) resin layer 150 the same as cured poly(aryl ether ketone) resin layer 130B of FIGS. 1A, 1B and 1C, which acts as the data-recording layer. An optional tip penetration stop layer may be formed between cured poly(aryl ether ketone) resin layer 150 and substrate 145. In one example, substrate 145 comprises silicon. Cured poly(aryl ether ketone) resin layer 150 may be formed by solution coating, spin coating, dip coating or meniscus coating uncured poly (aryl ether ketone) resin formulations and performing a curing operation on the resultant coating. In one example, curing is performed between a temperature of about 300° C. and about 400° C. In one example, cured poly(aryl ether ketone) resin layer 150 has a thickness between about 10 nm and about 500 nm and a variation in thickness across a writeable region of cured poly(aryl ether ketone) resin layer 150 of less than about 1.0 nm across the cured poly(aryl ether ketone) resin layer. The composition of cured poly(aryl ether ketone) resin layer 150 is the same as cured poly(aryl ether ketone) resin layer 130B of FIG. 1C. Positioned over cured poly(aryl ether ketone) resin layer 150 is a probe assembly 155 including an array of probe tip assemblies 100 (described supra). Probe assembly 155 may be moved in the X, Y and Z directions relative to substrate 145 and cured poly(aryl ether ketone) resin layer 150 by any number of devices as is known in the art. Switching arrays 160A and 160B are connected to respective rows (X-direction) and columns (Y-direction) of probe tip assemblies 100 in order to allow addressing of individual probe tip assemblies. Switching arrays 160A and 160B are connected to a controller 165 which includes a write control circuit for independently writing data bits with each probe tip assembly 100, a read control circuit for independently reading data bits with each probe tip assembly 100, an erase control circuit for independently erasing data bits with each probe tip assembly 100, a heat control circuit for independently controlling each heater of each of the probe tip assemblies 100, and X, Y and Z control circuits for controlling the X, Y and Z movement of probe assembly 155. The Z control circuit controls a contact mechanism (not shown) for contacting the cured poly(aryl ether ketone) resin layer 150 with the tips of the array of probe tip assemblies 100.

During a write operation, probe assembly 155 is brought into proximity to cured poly(aryl ether ketone) resin layer 150 and probe tip assemblies 100 are scanned relative to the cured poly(aryl ether ketone) resin layer. Local indentations 135 are formed as described supra. Each of the probe tip assemblies 100 writes only in a corresponding region 170 of cured poly (aryl ether ketone) resin layer 150. This reduces the amount of travel and thus time required for writing data.

During a read operation, probe assembly 155 is brought into proximity to cured poly(aryl ether ketone) resin layer 150 and probe tip assemblies 100 are scanned relative to the cured poly(aryl ether ketone) resin layer. Local indentations 135 are detected as described supra. Each of the probe tip assemblies 100 reads only in a corresponding region 170 of cured poly (aryl ether ketone) resin layer 150. This reduces the amount of travel and thus the time required for reading data.

During an erase operation, probe assembly 155 is brought into proximity to cured poly(aryl ether ketone) resin layer 150, and probe tip assemblies 100 are scanned relative to the cured poly(aryl ether ketone) resin layer. Local indentations 135 are erased as described supra. Each of the probe tip assemblies 100 reads only in a corresponding region 170 of cured poly(aryl ether ketone) resin layer 150. This reduces the amount of travel and thus time required for erasing data.

Additional details relating to data storage devices described supra may be found in the articles "*The Millipede—More than one thousand tips for future AFM data storage*," P. Vettiger et al., *IBM Journal of Research and Development*. Vol. 44 No. 3, May 2000 and "*The Millipede—Nanotechnology Entering Data Storage*," P. Vettiger et al., *IEEE Transaction on Nanotechnology*, Vol. 1, No, 1, March 2002. See also United States Patent Publication 2005/0047307, published Mar. 3, 2005 to Frommer et al. and United States Patent Publication 2005/0050258, published Mar. 3, 2005 to Frommer et al., both of which are hereby included by reference in there entireties.

Turning to the composition of cured poly(aryl ether ketone) resin layer 130B of FIGS. 1A through 1C and cured poly(aryl ether ketone) resin layer 150 of FIG. 2, there are multiple uncured resin formulations of poly(aryl ether ketone) oligomers containing moieties capable of forming two or more hydrogen bonds, terminal ethynyl moieties capable of covalent bonding and optional cross-linking agents that, when reacted (cured) together, cross-link to formed cured poly(aryl ether ketone) resin layers. The hydrogen bonding moieties provide thermally reversible hydrogen bond cross-linking, in a first example, at room temperature and, in a second example, below about 100° C. The terminal ethynyl moieties and optional cross-linking agents provide non-thermally reversible cross-linking. Room temperature is defined as a temperature between about 18° C. and about 25° C. It should be understood that for the purposes of the present invention curing an oligomer implies cross-linking the oligomer to form a resin. Oligomers themselves are short chain oligomers. In one example, the poly(aryl ether ketone) oligomers of the embodiments of the present invention advantageously have molecular weights between about 3000 Daltons and about 20,000 Daltons and preferably between about 4000 Daltons and about 8000 Daltons.

The poly(aryl ether ketone) medium or imaging layer of the embodiments of the present invention advantageously meets certain criteria. These criteria include high thermal stability to withstand millions of write and erase events, low wear properties (low pickup of material by tips), low abrasion (tips do not easily wear out), low viscosity for writing, glassy character with little or no secondary relaxations for long data bit lifetime, and shape memory for erasability.

Cured poly(aryl ether ketone) resins according to embodiments of the present invention have high temperature stability while maintaining a low glass transition temperature (Tg).

The glass transition temperature should be adjusted for good write performance. To optimize the efficiency of the write process there should be a sharp transition from the glassy state to the rubbery state. A sharp transition allows the cured resin to flow easily when a hot tip is brought into contact and quickly return to the glassy state once the hot tip is removed. However, too high a $T_g$ leads to high write currents and damage to the probe tip assemblies described supra.

Because the cross-linking bonds between poly(aryl ether ketone) oligomers formed by the hydrogen bonding linkers are thermally reversible, less energy is required to thermally deform the poly(aryl ether ketone) resin as breaking the hydrogen bonds effectively and momentarily lowers the $T_g$ of the poly(aryl ether ketone) resin, which then returns to its higher value when the heat source is removed and the hydrogen bonds reestablish themselves.

Further control over the cross-link density was achieved by adding controlled amounts of reactant diluents described infra that enhance covalent cross-linking. These reactive diluents form a high density of cross-links that enhance the wear properties of the poly(aryl ether ketone) medium without greatly increasing the $T_g$ or breadth of the glass transition.

A formulation of poly(aryl ether ketone) copolymer according to embodiments of the present invention comprises one or more poly(aryl ether ketone) copolymers, each poly(aryl ether ketone) copolymer of the one or more poly(aryl ether ketone) copolymers having the structure:

(i) m repeat units represented by the structure —$R^1$—O—$R^2$—O— interspersed with n repeat units represented by the structure —$R^3$—O—$R^2$—O—, each repeat unit of the m repeat units terminated by a first terminal group represented by the structure $R^4$—O— and a second terminal group represented by the structure —$R^1$—O—$R^4$; or (ii) m repeat units represented by the structure —$R^1$—O—$R^2$—O— interspersed with n repeat units represented by the structure —$R^3$—O—$R^2$—O—, each repeat unit of the m repeat units terminated by a first terminal group represented by the structure $R^6$—O—$R^2$— and a second terminal group represented by the structure —$R^6$;

wherein O=oxygen, and occurs as a link between all R groups;

wherein $R^1$ is selected from the group consisting of:

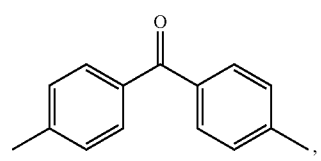

(I)

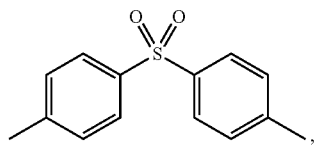

(II)

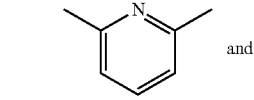

and (III)

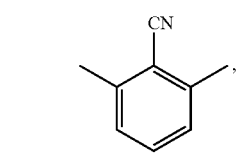

(IV)

wherein $R^2$ is selected from the group consisting of:

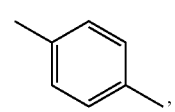

(V)

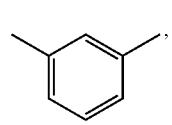

(VI)

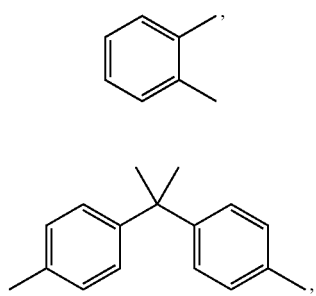
(VII),

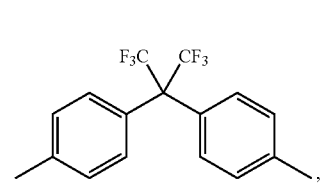
(VIII),

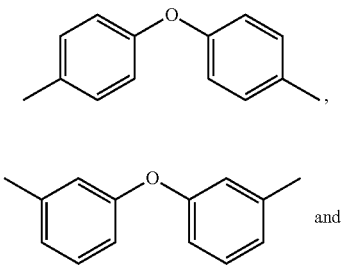
(IX),

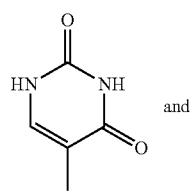
(XV), wherein R⁵ is selected from the group consisting of

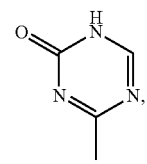
(XVIA)

and (XVIB)

wherein R⁴ is selected from the group consisting of mono(arylacetylenes), mono(phenylethynyls),

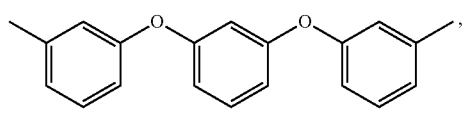
(X), (XI) and

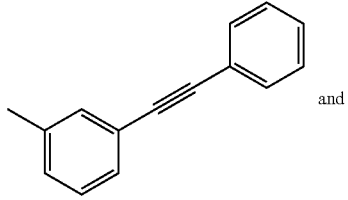
(XVII) and (XII), wherein R³ is selected from the group consisting of

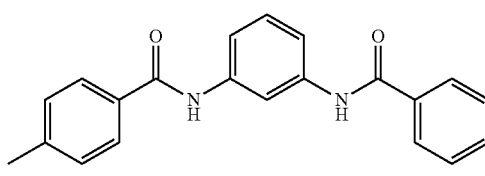
(XIIIA),

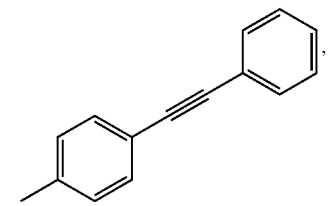
(XVIII), wherein R⁶ is selected from the group consisting of mono(arylacetylenes), mono(phenylethynyls),

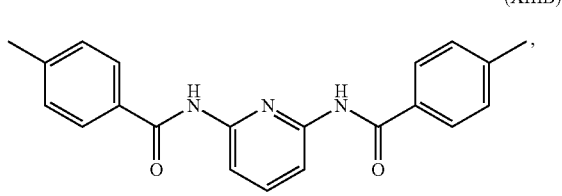
(XIIIB),

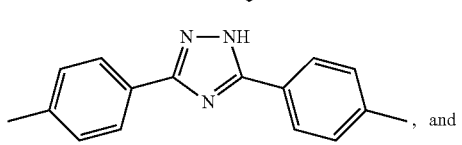
(XIV), and

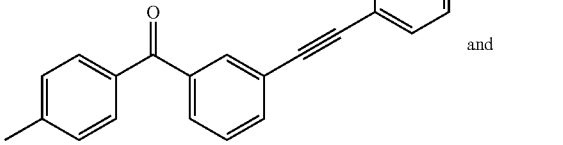
(XIX) and

-continued (XX)

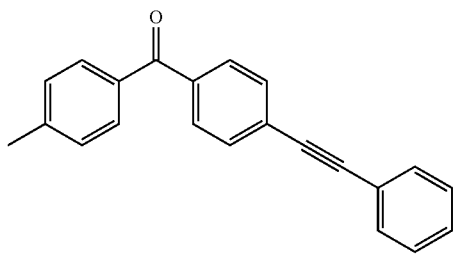

and wherein, for either (i) or (ii), m and n are integers of 1 or more, m+n is from about 3 to about 30, and the ratio m/n is about 2 or more.

The acetylene moieties in the $R^4$ groups react during thermal curing with each other to cross-link the poly(aryl ether ketone) copolymers into a poly(aryl ether ketone) resin by cyclo-addition.

In a first example, poly(aryl ether ketone) copolymers according to embodiments of the present invention advantageously have a molecular weight between about 3000 Daltons and about 20,000 Daltons and preferably between about 4000 Daltons and about 8000 Daltons.

As indicated supra, reactive diluents may be added to the poly(aryl ether ketone) copolymer formulations prior to thermal curing. Examples of reactive diluents include structure XXI:

(XXI)

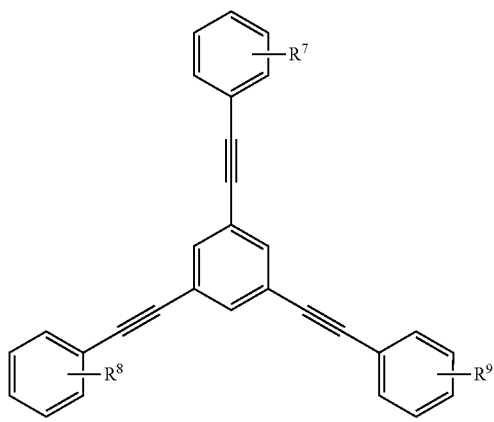

where $R^7$, $R^8$ and $R^9$ are each independently selected from the group consisting of hydrogen, alkyl groups, aryl groups, cycloalkyl groups, alkoxy groups, aryloxy groups, alkylamino groups, arylamino groups, alkylarylamino groups, arylthio, alkylthio groups and structure XXII:

(XXII)

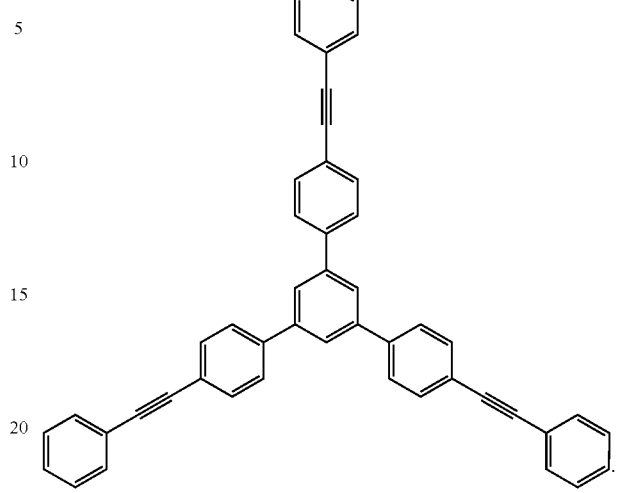

It should be noted that reactive diluents XXI and XXII each contain three substituted phenylethynyl groups. The phenylethynyl groups of the poly(aryl ether ketone) oligomers and the phenylethynyl group's reactive diluents provide the cross-linking of the poly(aryl ether ketone) oligomers into a poly (aryl ether ketone) resin.

An exemplary hydrogen-bonding cross-linking of poly (aryl ether ketone) oligomers according to embodiments of the present invention is illustrated in structure (XXIII). The thermally reversible hydrogen bonds (indicated by the dashed lines) are capable of evanescence and reversion. Generally speaking evanescence and reversion of a thermally reversible bond is an equilibrium process. Above a threshold temperature, evanescence of the bond is favored. Below the threshold temperature, reversion of the bond is favored. Hydrogen bonding may also be described as a donation and withdrawal of electrons to a thermally reversible bond. Structures (XIIIA), (XIIIA), (XIV), (XVIA) and (XVIB) are capable of forming two hydrogen bonds each. Moieties containing three or more =N—H groups may be substituted for structures (XIIIA), (XIIIA), (XIV), (XVIA) and (XVIB) and would be each capable of forming numbers of hydrogen bonds corresponding to the number of =N—H groups in the monomer.

(XXIII)

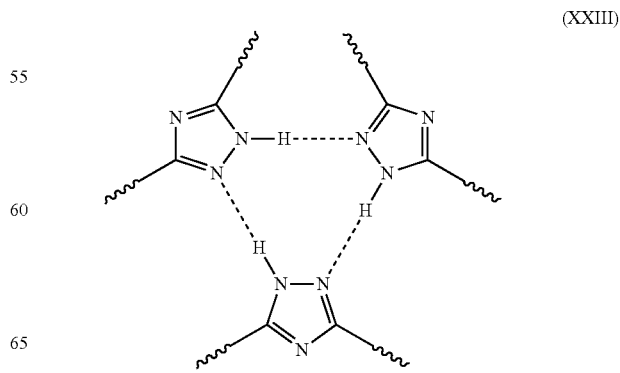

By contrast, covalent bonds are not capable of evanescence and reversion as described supra, but remain relatively stable over a range of temperatures, until such temperatures at which the bond irreversibly/permanently degrades.

EXPERIMENTAL

Preparation of
N-(5-uracil-yl)-4,4'-difluorobenzophenone imine
(precursor of monomer structure XV where $R^5$ is
structure XVIA)

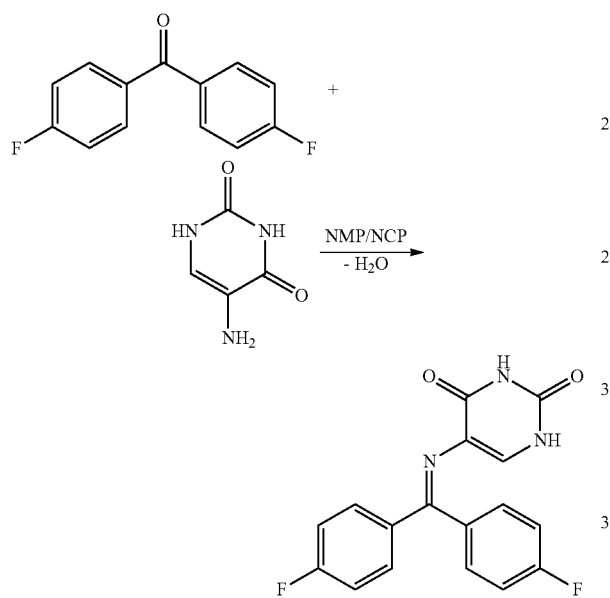

In a round bottom flask equipped with an overhead stirrer, 1.16 grams (0.009 mole) of 5-aminouracil was charged along with 6 grams (0.027 mole) of 4,4'-difluorobenzophenone and a N-methylpyrrolidone/N-cyclohexylpyrrolidone solvent mixture (50/50, 20 milliliters). The reaction mixture was then heated to 180° C. for 3 days. A charge of hexanes (100 milliliters) was added to fully induce precipitation, and the solid was isolated by filtration and twice recrystallized from isopropanol. The product was rinsed with isopropanol, suction dried, and vacuum dried in an oven overnight.

Preparation of
1,3-bis(4-fluorobenzoylamino)benzene (precursor of
monomer structure XIIIA)

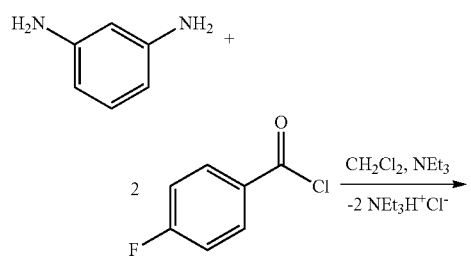

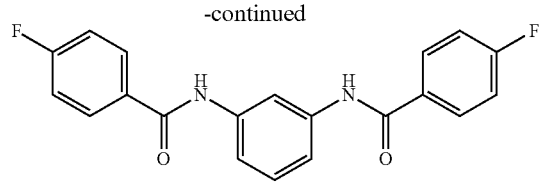

1,3-Phenylenediamine (10.8 grams, 0.1 mole) was dissolved in 500 milliliters dichloromethane and triethylamine (28.0 milliliters, 20.2 grams, 0.2 mole) was added. The solution was chilled to 0° C. before 4-fluorobenzoyl chloride (24.0 milliliters, 31.7 grams, 0.2 mole) was added drop-wise over the course of 30 minutes. After stirring for 2 hours at 0° C., the solution was allowed to warm to room temperature (25° C.) and stirred for 18 hours. The resulting precipitate was isolated by filtration and suction dried. The precipitate was re-suspended in 300 milliliters of refluxing ethanol for 30 minutes, then cooled, isolated by filtration, rinsed with ethanol, suction dried, and vacuum dried in an oven overnight. The yield was 32.0 grams of white powder.

Preparation of
2,6-bis(4-fluorobenzoylamino)pyridine (precursor of
monomer structure XIIIB)

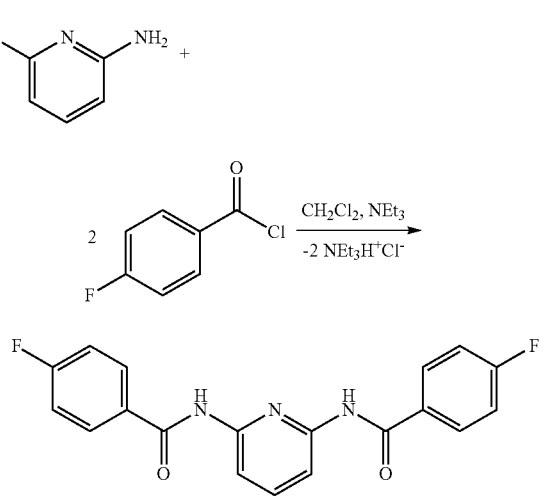

2,6-Diaminopyridine (10.9 grams, 0.1 mole) was dissolved in 500 milliliters dichloromethane and triethylamine (28.0 milliliters, 20.2 grams, 0.2 mole) was added. The solution was chilled to 0° C. before 4-fluorobenzoyl chloride (24.0 milliliters, 31.7 grams, 0.2 mole) was added drop-wise over the course of 30 minutes. After stirring for 2 hours at 0° C., the solution was allowed to warm to room temperature (25° C.) and stirred for 18 hours. The resulting precipitate was isolated by filtration and suction dried. The precipitate was recrystallized from 300 milliliters of refluxing ethanol, isolated by filtration, rinsed with ethanol, suction dried, and vacuum dried in an oven overnight. The yield was 34.0 grams of white crystals.

Preparation of Exemplary Poly(Aryl Ether Ketone)
Copolymer of Structure (i)

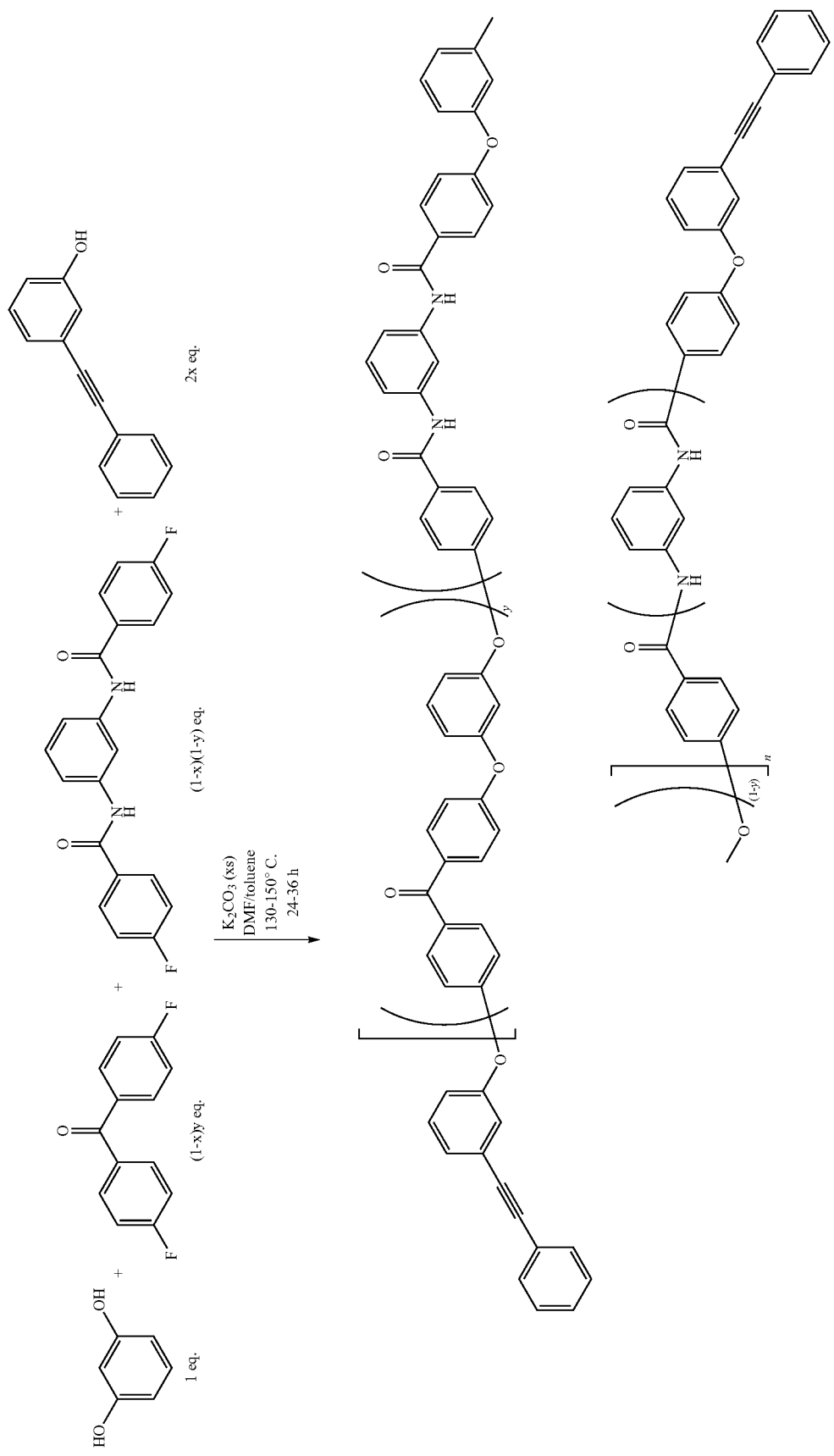

A mixture of 4,4'-difluorobenzophenone (1.2123 grams, 5.556 mmol), 1,3-bis(4-fluorobenzoylamino)benzene (0.4889 grams, 1.389 mmol), resorcinol (0.7111 grams, 6.459 mmol), 3-hydroxydiphenylacetylene (0.1886 grams, 0.972 mmol) and anhydrous potassium carbonate (3 grams) in dimethylformamide (10 milliliters) and toluene (25 milliliters) was mechanically stirred and heated in a 130° C. oil-bath under a dinitrogen atmosphere for 21 hours, while periodically removing toluene via a Dean-Stark trap. The temperature of the oil-bath was then raised to 150° C. for 9 hours. The mixture was cooled, tetrahydrofuran (10 milliliters) was added, and the slurry was poured into methanol (400 milliliters) with 1 M aqueous. HCl added (50 milliliters). The resulting precipitate was collected by filtration, rinsed with methanol, suction dried, then dried in a vacuum oven to give 1.5 grams of an off-white powder.

The (i) structure poly(aryl ether ketone) oligomer preparation just described should not be thought of as requiring the monomers within the ( )y being in a first linear subsequence followed by all monomers within the ( )(1-y) being in a second linear subsequence; they are shown that way to indicate there are y and (1-y) numbers of the two monomers respectively. Rather, the two monomers may be arranged in a linear sequence with (a) all y type monomers in one subsequence and all (1-y) type monomers in another subsequence, (b) in an alternating sequence, (c) in other regular repeating sequences or (d) in random sequence. Further, n must be at least 1 and indicates that there is a least one ( )y group and at least one ( )(1-y) group.

Preparation of Exemplary Poly(Aryl Ether Ketone) Copolymer of Structure (ii)

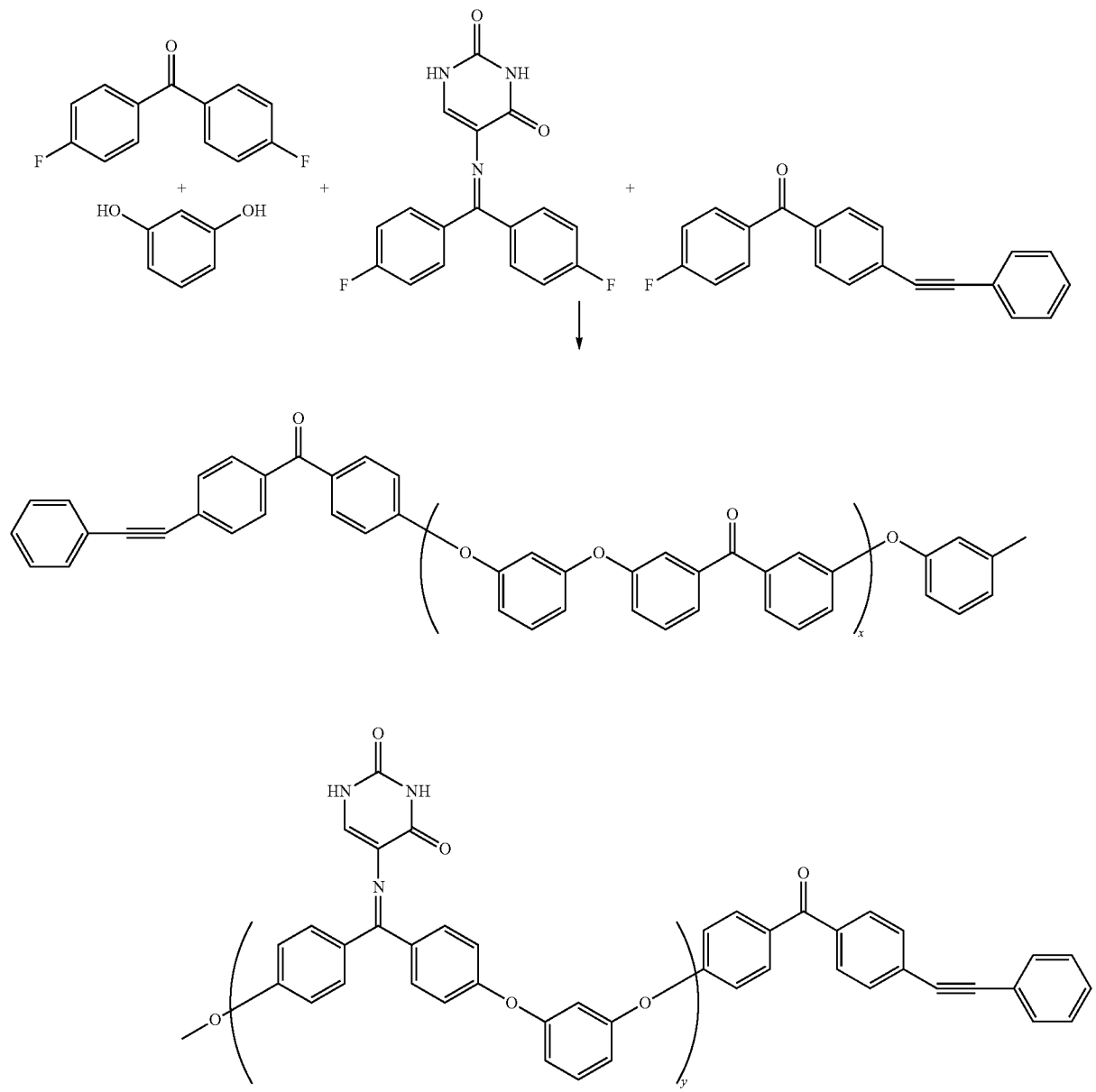

A mixture of 4,4'-difluorobenzophenone (0.867 grams, 5.900 mmol), DFBI (0.4809 grams, 1.470 mmol), resorcinol (0.70 grams, 6.35 mmol), 4-fluoro-4'-(phenylethynyl)benzophenone (0.267 grams, 0.89 mmol) and anhydrous potassium carbonate (3 grams) in dimethylformamide (10 milliliters) and toluene (25 milliliters) was mechanically stirred and heated in a 130° C. oil bath under a dinitrogen atmosphere for 21 hours, while periodically removing toluene via a Dean-Stark trap. The temperature of the oil bath was then raised to 150° C. for 9 hours. The mixture was cooled, tetrahydrofuran (10 milliliters) was added, and the slurry was poured into methanol (400 milliliters). The resulting precipitate was collected by filtration, rinsed with methanol, suction dried, then dried in a vacuum oven to give 1.3 grams of an off-white powder.

The (ii) structure poly(aryl ether ketone) oligomer preparation just described should not be thought of as requiring the monomers within the ( )x being in a first linear subsequence followed by all monomers within the ( )y being in a second linear subsequence; they are shown that way to indicate there are x and y numbers of the two monomers respectively. Rather, the two monomers may be arranged in a linear sequence with (a) all x type monomers in one subsequence and all y type monomers in another subsequence, (b) in an alternating sequence, (c) in other regular repeating sequences or (d) in random sequence. Further, there is a least one ( )y group and at least one ( )x group.

Thus, the embodiments of the present invention provide data storage and imaging methodologies that operate in the nanometer regime.

The description of the embodiments of the present invention is given above for the understanding of the present invention. It will be understood that the invention is not limited to the particular embodiments described herein, but is capable of various modifications, rearrangements and substitutions as will now become apparent to those skilled in the art without departing from the scope of the invention. Therefore, it is intended that the following claims cover all such modifications and changes as fall within the true spirit and scope of the invention.

What is claimed is:

1. A composition of matter, comprising:
one or more poly(aryl ether ketone) copolymers, each of said one or more poly(aryl ether ketone) copolymers comprising (a) a first repeat unit including an aryl ether ketone and (b) a second repeat unit including an aryl ether ketone and an aromatic secondary amine or cyclic secondary amine hydrogen bonding cross-linking moiety, said hydrogen bonding cross-linking moiety capable of forming hydrogen bond at room temperature, each of said one or more poly(aryl ether ketone) copolymers having two terminal ends, each terminal end having a phenylethynyl moiety.

2. The composition of matter of claim 1, wherein each poly(aryl ether ketone) copolymer of said one or more poly (aryl ether ketone) copolymers includes:
(i) m repeat units represented by the structure —R$^1$—O—R$^2$—O— interspersed with n repeat units represented by the structure —R$^3$—O—R$^2$—O—, each repeat unit of said m repeat units terminated by a first terminal group represented by the structure R$^4$—O— and a second terminal group represented by the structure —R$^1$—O—R$^4$; or
(ii) m repeat units represented by the structure —R$^1$—O—R$^2$—O— interspersed with n repeat units represented by the structure —R$^3$—O—R$^2$—O—, each repeat unit of said m repeat units terminated by a first terminal group represented by the structure R$^6$—O—R$^2$— and a second terminal group represented by the structure —R$^6$;
wherein O=oxygen, and occurs as a link between all R groups;
wherein R$^1$ is selected from the group consisting of:

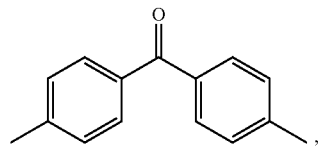

wherein R$^2$ is selected from the group consisting of:

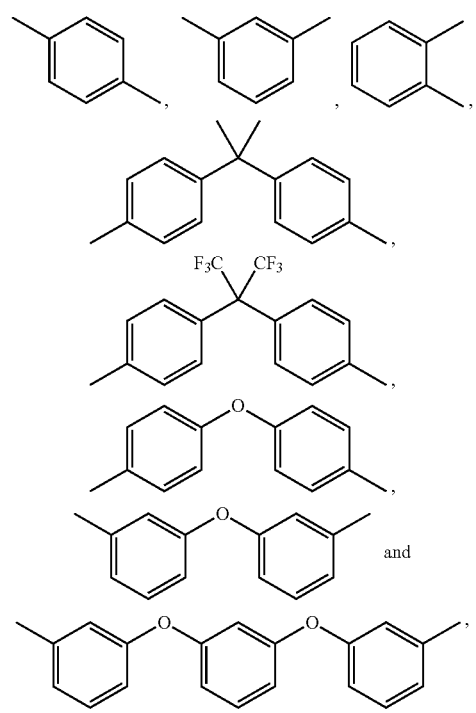

and wherein R$^3$ is selected from the group consisting of

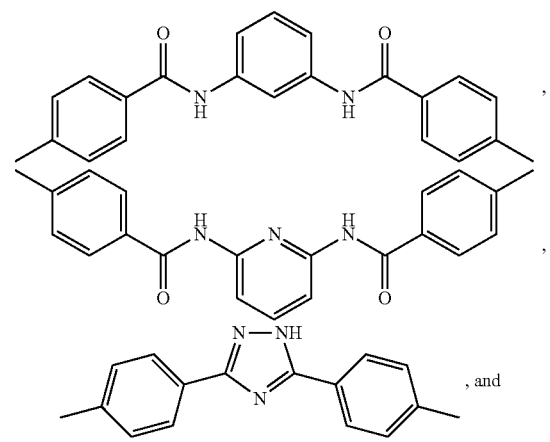

, and

-continued

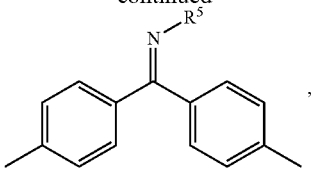

wherein R⁵ is selected from the group consisting of

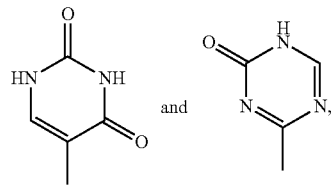
and wherein R⁴ is selected from the group consisting of mono(arylacetylenes), mono(phenylethynyls),

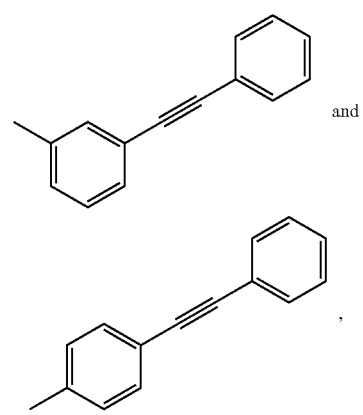
and

, wherein R⁶ is selected from the group consisting of mono(arylacetylenes), mono(phenylethynyls),

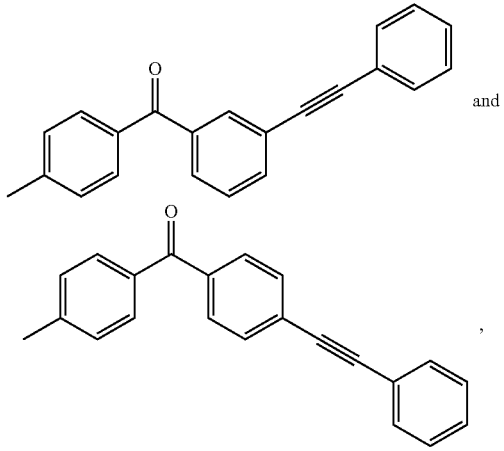
and

, wherein, for either (i) or (ii), m and n are integers of 1 or more, m+n is from about 3 to about 30, and the ratio m/n is about 2 or more.

3. The composition of claim 2, further including a reactive diluent having the structure:

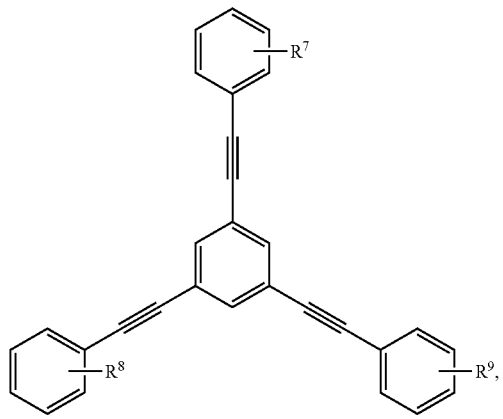

where R⁷, R⁸ and R⁹ are each independently selected from the group consisting of hydrogen, alkyl groups, aryl groups, cycloalkyl groups, alkoxy groups, aryloxy groups, alkylamino groups, arylamino groups, alkylarylamino groups, arylthio, alkylthio groups.

4. The composition of matter of claim 2, wherein, in (i) and (ii) said m repeat units and said n repeat units are randomly interspersed.

5. The composition of matter of claim 2, wherein, in (ii) the ratio m/n is equal to or greater than about 2.

6. The composition of matter of claim 1, wherein each of said one or more poly(aryl ether ketone) copolymers has a molecular weight between about 3,000 Daltons and about 20,000 Daltons.

7. The composition of matter of claim 1, wherein each of said one or more poly(aryl ether ketone) copolymers has a molecular weight between about 4,000 Daltons and about 8,000 Daltons.

8. The composition of claim 2, further including a reactive diluent having the structure:

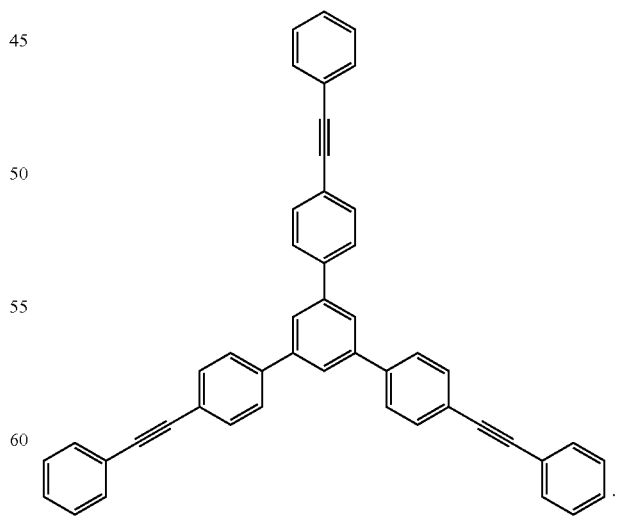

.

9. The composition of matter of claim 1, wherein at least one of said one or more poly(aryl ether ketone) copolymers has the structure:

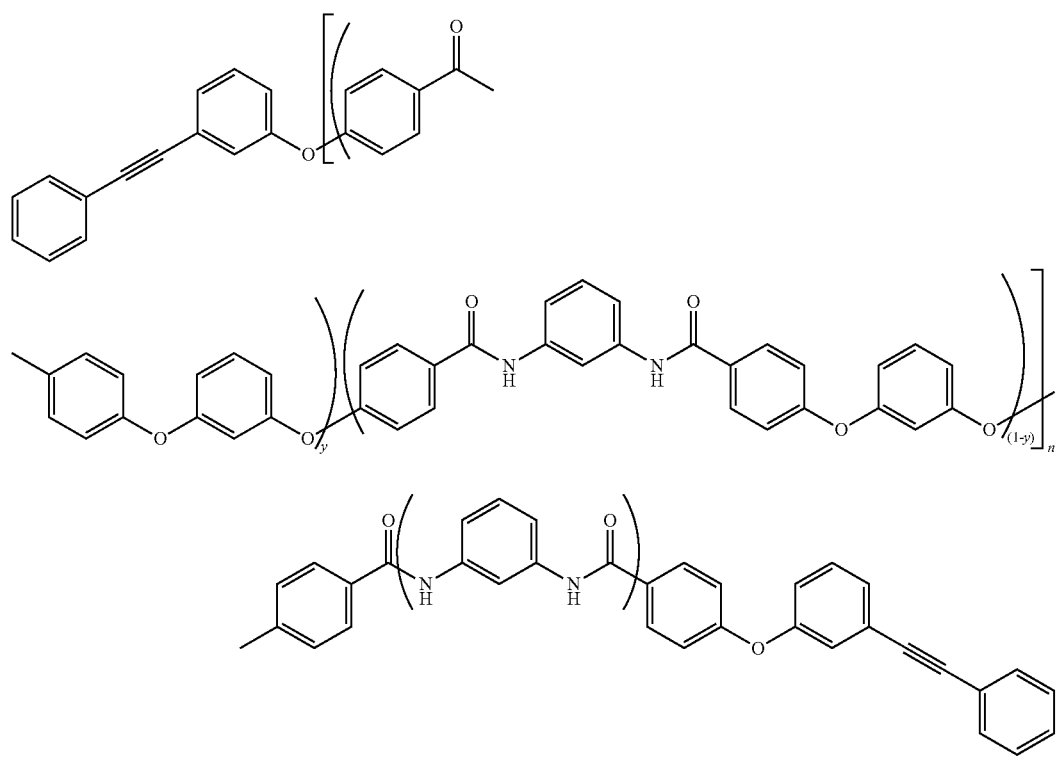

wherein y is greater than zero and less than 1;
the ratio of the number of first monomers to the ratio of the number of second monomers is y/(1-y); and
n is a positive integer equal to greater than 1.

10. The composition of matter of claim 9, wherein the y repeat units and the y-1 repeat units are arranged a random sequence.

11. The composition of matter of claim 1, wherein at least one of said one or more poly(aryl ether ketone) copolymers has the structure:

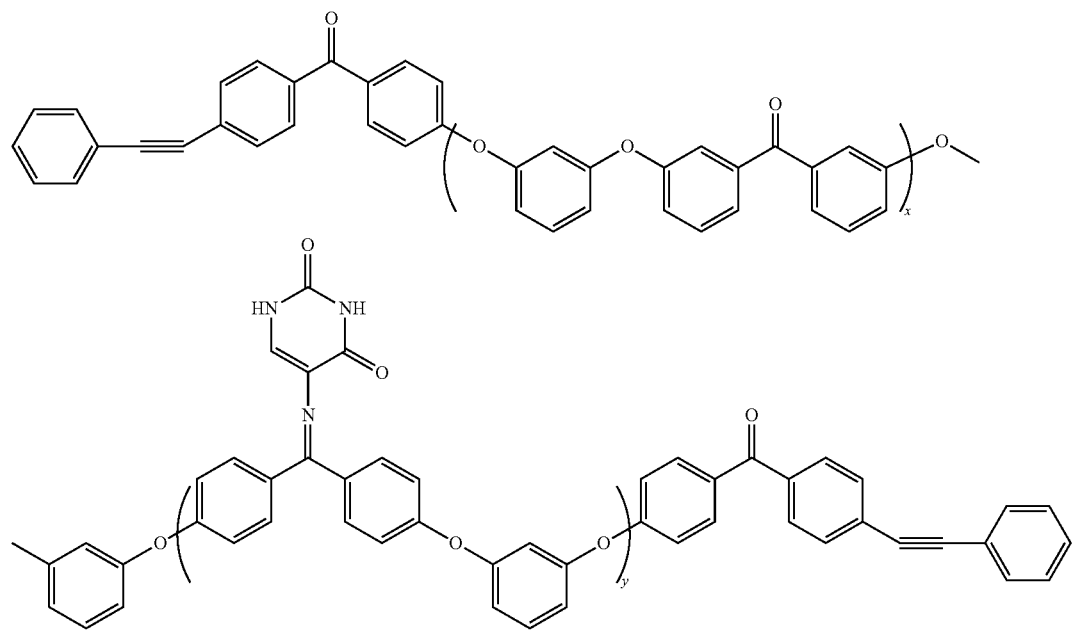

wherein there are x first monomers and y second monomers; and x and y are positive integers independently equal to or greater than 1.

12. The composition of matter of claim 11, wherein the x repeat units and the y repeat units are arranged a random sequence.

13. The composition of matter of claim 1, wherein said hydrogen bonding cross-linking moiety capable of forming two or more hydrogen bonds at room temperature.

* * * * *